US009430222B2

(12) United States Patent
Denise et al.

(10) Patent No.: US 9,430,222 B2
(45) Date of Patent: Aug. 30, 2016

(54) CONTROLLING A RUNNING APPLICATION FOR LIVE SCENE GRAPH EDITING

(75) Inventors: Jean-Francois Denise, Biviers (FR); Andrew Allenson, London (GB); Anthony Rogers, Santa Clara, CA (US); John Burkey, San Jose, CA (US); Eamonn P. Mcmanus, Grenoble (FR)

(73) Assignee: Oracle International Corporation, Redwood Shores, CA (US)

( * ) Notice: Subject to any disclaimer, the term of this patent is extended or adjusted under 35 U.S.C. 154(b) by 957 days.

(21) Appl. No.: 12/786,113

(22) Filed: May 24, 2010
(Under 37 CFR 1.47)

(65) Prior Publication Data
US 2011/0289192 A1    Nov. 24, 2011

(51) Int. Cl.
*G06F 9/445* (2006.01)
*G06F 17/30* (2006.01)
*H04L 29/08* (2006.01)

(52) U.S. Cl.
CPC . *G06F 8/67* (2013.01); *G06F 8/60* (2013.01); *G06F 17/30867* (2013.01); *H04L 67/02* (2013.01)

(58) Field of Classification Search
None
See application file for complete search history.

(56) References Cited

U.S. PATENT DOCUMENTS

| 5,999,972 | A | * | 12/1999 | Gish | 709/219 |
| 6,141,724 | A | * | 10/2000 | Butler et al. | 717/107 |
| 6,230,309 | B1 | * | 5/2001 | Turner | G06F 8/36 717/107 |
| 7,047,518 | B2 | * | 5/2006 | Little | G06F 8/10 717/104 |
| 7,117,113 | B1 | * | 10/2006 | Baekelmans et al. | 702/123 |
| 7,228,353 | B1 | * | 6/2007 | Franceschelli et al. | 709/229 |
| 7,523,116 | B2 | * | 4/2009 | Yan | |
| 7,703,024 | B2 | * | 4/2010 | Kautzleben et al. | 715/749 |
| 7,962,512 | B1 | * | 6/2011 | Sholtis et al. | 707/777 |
| 8,117,601 | B2 | * | 2/2012 | Owens et al. | 717/128 |
| 8,154,453 | B2 | * | 4/2012 | Gobara | 342/378 |
| 8,214,795 | B2 | * | 7/2012 | Cheriton | 717/104 |
| 2003/0028466 | A1 | * | 2/2003 | Jenson | G06Q 40/00 705/36 R |
| 2005/0097082 | A1 | * | 5/2005 | Yan | 707/3 |
| 2005/0256882 | A1 | * | 11/2005 | Able | G06Q 10/10 |
| 2006/0048165 | A1 | * | 3/2006 | Kautzleben et al. | 719/329 |
| 2006/0116841 | A1 | * | 6/2006 | Baekelmans et al. | 702/121 |
| 2006/0218228 | A1 | * | 9/2006 | Mouline | G06Q 10/06 709/203 |
| 2006/0253834 | A1 | * | 11/2006 | Cacenco | G06F 8/34 717/107 |
| 2007/0129014 | A1 | * | 6/2007 | Bertorello | H04L 12/1813 455/41.2 |
| 2008/0114641 | A1 | * | 5/2008 | Keenum | 705/10 |

(Continued)

OTHER PUBLICATIONS

Gail Anderson, Paul Anderson, Essential JavaFX, 2009.*

(Continued)

*Primary Examiner* — Ninos Donabed
(74) *Attorney, Agent, or Firm* — Osha Liang LLP

(57) ABSTRACT

In general, in one aspect, the invention relates to a computer readable medium including software instructions for performing a method, the method including receiving, by a content server, a first request from a client for an application content file, wherein the application content file is associated with a first Java network launch protocol (JNLP) file, providing, in response to the first request, the application content file; receiving, from the client, a second request to edit the application content file, providing, in response to the second request, an application designer tool to the client; receiving, from the client, an altered application content file generated using the application designer tool, generating a second JNLP file associated with the altered application content file, and providing, to a webserver, the second JNLP file.

24 Claims, 5 Drawing Sheets

(56) References Cited

U.S. PATENT DOCUMENTS

| | | | | |
|---|---|---|---|---|
| 2008/0208602 | A1* | 8/2008 | Westernoff | 705/1 |
| 2008/0209392 | A1* | 8/2008 | Able | G06F 8/34 |
| | | | | 717/105 |
| 2009/0128365 | A1* | 5/2009 | Laskin | G08G 1/01 |
| | | | | 340/937 |
| 2009/0210702 | A1* | 8/2009 | Welingkar | H04L 9/321 |
| | | | | 713/156 |
| 2009/0293046 | A1* | 11/2009 | Cheriton | 717/136 |
| 2010/0077329 | A1* | 3/2010 | Korn | 715/764 |
| 2010/0131936 | A1* | 5/2010 | Cheriton | 717/146 |

OTHER PUBLICATIONS

Hassan A. Artail, A client-based customization framework for web applications using JNLP, Nov. 18, 2003, Computer Standards & Interfaces 26 (2004) 411-422.*

International Search Report from PCT/US2001/036469 dated Aug. 22, 2011 (4 pages).

Written Opinion from PCT/US2011/036469 dated Aug. 22, 2011 (9 pages).

Yanagisawa, H et al.; "Server Side C-DASH: Ubiquitous Hardware/Software Codesign Environment"; Proceedings of the 7th International Conference on Mobile Data Management; Toyo University, Japan; 2006 (5 pages).

El Rhalibi, A. et al.; "3D Java Web-Based Games Developement and Deployment"; International Conference Multimedia Computing & Systems; UK; 2009 (7 pages).

"Java Web Start", Sun Microsystems, Inc., Technical Articles and Tips: Java Web Start Architecture, Jan. 6, 2010, http://java.sun.com/javase/technologies/desktop/javawebstart/architecture.html (3 Pages).

"Java Web Start Architecture for deploying application clients", Last Updated Dec. 10, 2009, http://publib.boulder.ibm.com/infocenter/wsdoc400/v6r0/index.jsp?topic=/com.ibm.websphere.iseries.doc/info/ae/ae/ccli_architect.html (3 Pages).

"Protocol Design", Jan Newmarch, Copyright Jan Newmarch, Monash University, 2007 http://jan.newmarch.name/distjava/protocol/lecture.html (24 Pages).

Written Opinion from PCT/US2011/036469 dated Dec. 6, 2012 (7 pages).

Office Action issued in counterpart Chinese Patent Application No. 201180002458.5, mailed Mar. 4, 2015 (11 pages).

* cited by examiner

CONTROLLING A RUNNING APPLICATION FOR LIVE SCENE GRAPH EDITING

BACKGROUND

Modern computer applications may be stored on computers in geographically remote locations, or on multiple computers around the world, in order to provide end users with convenient access to the applications. In addition, such applications may be heavily relied upon by end users such that an interruption in access to such applications may cause considerable social and financial frustrations.

Typical computer applications are made unavailable to end users for a period of time when a new version of the application is deployed. Further, changes made to typical computer applications may only be viewed once the application has been redeployed after the changes have been made.

SUMMARY

In general, in one aspect, the invention relates to a computer readable medium including software instructions for performing a method, the method including receiving, by a content server, a first request from a client for an application content file, wherein the application content file is associated with a first Java network launch protocol (JNLP) file, providing, in response to the first request, the application content file; receiving, from the client, a second request to edit the application content file, providing, in response to the second request, an application designer tool to the client; receiving, from the client, an altered application content file generated using the application designer tool, generating a second JNLP file associated with the altered application content file, and providing, to a webserver, the second JNLP file.

In general, in one aspect, the invention relates to a system. The system includes a content server which includes a processor, an application content file, and a memory configured to store instructions, wherein the instructions, when executed by the processor, cause the content server to receive a first request from a client for the application content file, wherein the application content file is associated with a first Java network launch protocol (JNLP) file, provide, in response to the first request, the application content file, receive, from the client, a second request to edit the application content file, provide, in response to the second request, an application designer tool to the client; receive, from the client, an altered application content file generated using the application designer tool, generate a second JNLP file associated with the altered application content file, and provide, to a webserver, the second JNLP file.

In general, in one aspect, the invention relates to a computer readable medium including software instructions for performing a method, the method including sending, by a client, a first request to a webserver for an application content file, wherein the application content file is associated with a Java network launch protocol (JNLP) file, receiving, from the webserver in response to the first request, the JNLP file, sending a second request to a content server, wherein the second request comprises at least a portion of the JNLP file, receiving, from the content server in response to the second request, the application content file, sending, to the content server, a second request to edit the application content file, receiving, from the content server in response to the third request, an application designer tool to the client, editing the application content file using the application designer tool to obtain an altered content file, sending, to the content server, a fourth request comprising the altered content file.

DETAILED DESCRIPTION

Figure 1:
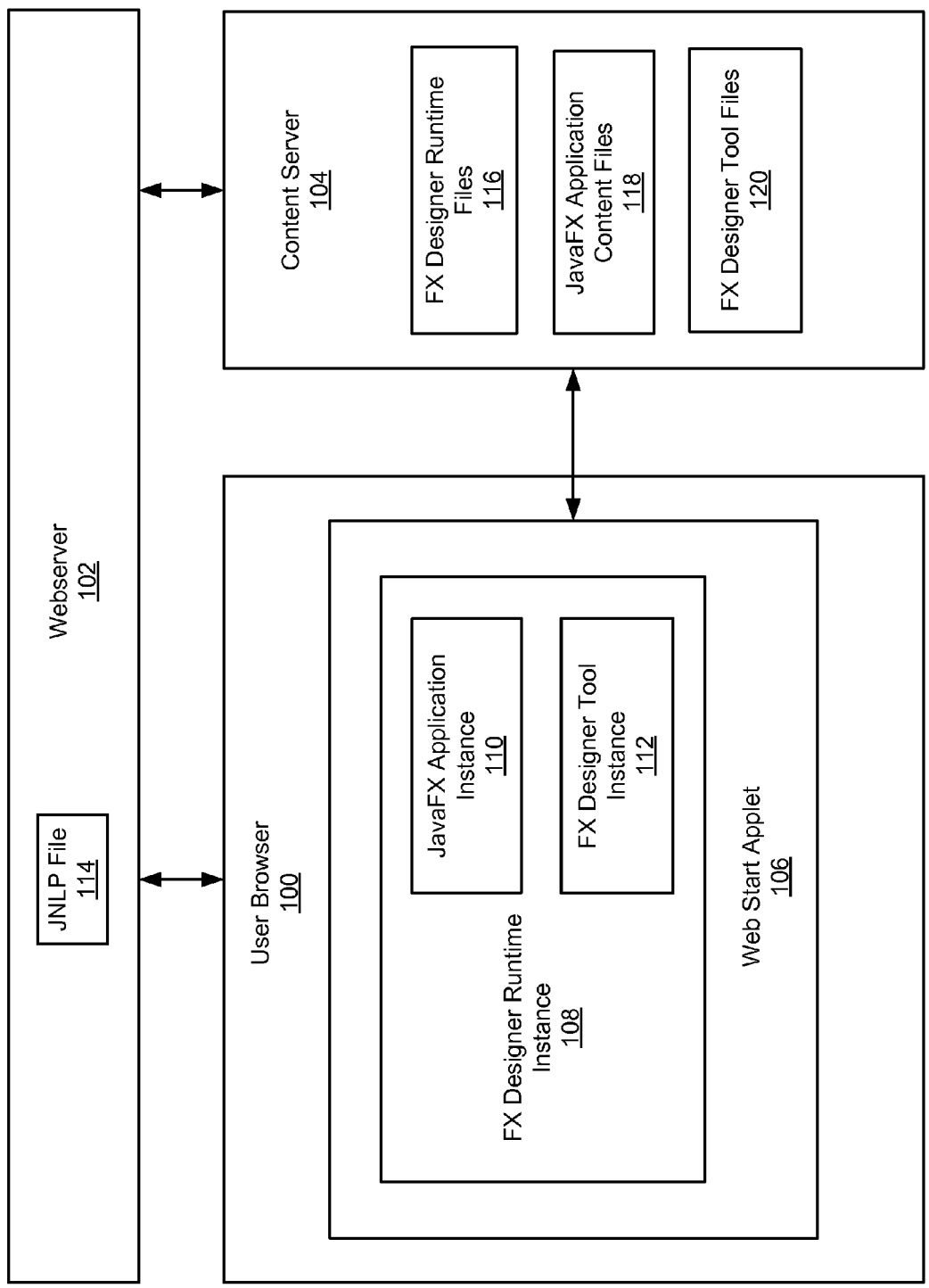
FIG. 1 shows a system in accordance with one or more embodiments of the invention.

Exemplary embodiments of the invention will be described with reference to the accompanying drawings. Like items in the drawings are shown with the same reference numbers.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to controlling a running JavaFX application for live scene graph editing. More specifically, embodiments of the invention relate a method and system for editing the content and behavior of a deployed (i.e., accessible by an end-user) JavaFX application without interrupting user access to the application. (Java® and JavaFX® are registered trademarks owned by Sun Microsystems, Inc., Mountain View, Calif.)

FIG. 1 shows a system in accordance with one embodiment of the invention. The system includes a User Browser (100), a Webserver (102), and a Content Server (104). The User Browser (100) includes a Web Start applet (106), an FX designer runtime instance (108), a JavaFX Application instance (110), and an FX Designer Tool instance (112). The Webserver (102) includes a Java Network Launching Protocol (JNLP) file (114). The Content Server (104) includes FX Designer Runtime files (116), JavaFX Application Content files (118), and FX Designer Tool files (120). Each of these components is discussed in detail below.

In one embodiment of the invention, the User Browser (100) is an application executing on a user computer system (not shown) used for interacting with internet content. The User Browser may be any internet browser known in the art capable of executing a Web Start applet (106), examples of which may include Internet Explorer® browser (Internet Explorer® is a registered trademark owned by Microsoft Corp.), Firefox® browser (Firefox® is a registered trademark owned by the Mozilla Foundation), Safari® browser (Safari® is a registered trademark owned by Apple Computer, Inc.), and Google Chrome™ browser (Google Chrome™ is a trademark owned by Google, Inc.).

In one embodiment of the invention, the User Browser (100), under the control of a user, may navigate to a webpage intended to host a JavaFX application (e.g., JavaFX Application instance (110)). In one embodiment of the invention, the webpage includes a reference to the JNLP file (114) associated with the embedded JavaFX application (e.g., JavaFX Application instance (110)). In one embodiment of the invention, the User Browser (100) is configured to request the JNLP file (114) from the Webserver (102).

In one embodiment of the invention, the Webserver (102) is configured to respond to a request by the User Browser (100) for a JavaFX application (e.g., JavaFX Application instance (110)) by providing, to the User Browser (100), a JNLP file (e.g., JNLP file (114)) associated with the JavaFX application (e.g., JavaFX Application instance (110)). In one embodiment of the invention, the Webserver (102) is an application executing on a computer system (not shown), configured to respond to requests sent over a network (e.g., a local area network, a wide area network, the Internet, etc.). In one embodiment of the invention, the Webserver (102) may store more than one JNLP file (e.g., JNLP file (114)). Further, each JNLP file may be associated with a different application, and multiple JNLP files (e.g., JNLP file (114)) may be associated with different versions of the same application. In one embodiment of the invention, the User Browser (100) is configured to instantiate a Web Start applet (e.g., Web Start applet (106)) in response to receiving a JNLP file (e.g., JNLP file (114)) from a webserver (e.g., Webserver (102)). In one embodiment of the invention, the User Browser (100) may provide a received JNLP file (e.g., JNLP file (114)) directly to the Web Start applet (106).

In one embodiment of the invention, the Web Start applet (106) creates a platform within the User Browser (100) capable of initializing Java application software (e.g., JavaFX Application instance (110)) using an associated JNLP file (e.g., JNLP file (114)). More specifically, in one embodiment of the invention, the Web Start applet (106) includes functionality for retrieving and executing a Java Runtime Environment (JRE) (e.g., FX Designer Runtime instance (108)) capable of executing the Java application (e.g., JavaFX Application instance (110)) associated with the JNLP file (114).

In one embodiment of the invention, the JNLP file (114) includes all necessary information for retrieving and executing the JavaFX Application instance (110). The information may include the network locations of the FX Designer Runtime files (114), the application content files (116), and the FX designer tool files (118). The information may further include the version number, configuration, and network location of the JRE (e.g., FX Designer Runtime instance (108)) necessary to execute the Java application (e.g., JavaFX Application instance (110)). Further, the information may specify the version number, configuration, and network location of the JRE for a given computer configuration. For example, a JNLP file (e.g., JNLP file (114)) may provide information regarding separate versions, configurations, and network locations based on a computer's hardware specifications, software specifications, or rate of network communication. Those skilled in the art will appreciate that other information may be included in the JNLP file (114).

In one embodiment of the invention, the Web Start applet (106) uses a JNLP file (e.g., JNLP file (114)) to determine the location and configuration of a FX Designer Runtime (e.g., FX Designer Runtime (108)). The Web Start applet (106) also may include functionality to request, from a content server (e.g., Content Server (104)), files associated with the FX Designer runtime (e.g., FX Designer Runtime files (116)). The FX Designer Runtime files (116) may be used by a Web Start applet (e.g., Web Start applet (106)) to instantiate a FX Designer Runtime instance (e.g., FX Designer Runtime instance (108)). Further, the Web Start applet (106) may include functionality to provide a FX Designer Runtime instance (e.g., FX Designer Runtime instance (108)) with a JNLP file (e.g., JNLP file (114)) provided by a user browser (e.g., User Browser (100)).

In one embodiment of the invention, the FX Designer Runtime instance (108) is a JRE which includes functionality to use the contents of a JNLP file (e.g., JNLP file (114)) to retrieve and execute the Java application (e.g., JavaFX Application instance (110)) associated with the JNLP file (e.g., JNLP file (114)). The JRE (or more specifically, instances of JREs (e.g., FX Designer Runtime instance (108))) provides a layer of software between the operating system and the application running within the JRE instance. The JRE instance includes functionality to allow the application to be agnostic with regard to the underlying operating system and hardware of the host machine. Said another way, an application with the ability to execute within a JRE instance may be executed on any machine capable of executing a compatible JRE instance.

In one embodiment of the invention, the FX Designer Runtime instance (108) requests content files (e.g., JavaFX Application Content files (118)) from a content server (e.g., Content Server (104)). In one embodiment of the invention, the FX Designer Runtime instance (108) uses the content files (e.g., JavaFX Application Content files (118)) to launch the application instance (e.g., JavaFX Application instance (110)). In one embodiment of the invention, the JavaFX Application Content files (118) include all files necessary for instantiating an application instance (e.g., JavaFX Application instance (110)). The JavaFX Application Content files (118) may include, for example, program code (e.g., Java classes, Java Archives, etc.), graphic files, audio files, etc. In one embodiment of the invention, the JavaFX Application Content files (118) may be distributed across more than one Content Server (e.g., Content Server (104)). In one embodiment of the invention, some JavaFX Application Content files (118) may be retrieved only when they are required by the executing application instance (e.g., JavaFX Application instance (110)).

In one embodiment of the invention, the Content Server (104) is a computing system which may include content management software (e.g., Mercurial, Concurrent Versions System (CVS)). In one embodiment of the invention, the Content Server (104) stores all files necessary to execute the application instance (e.g., JavaFX Application instance (110)), including the FX Designer Runtime files (e.g., FX Designer Runtime files (116)) and the content files (e.g., JavaFX Application Content files (118)). In addition, the Content Server (104) may also maintain a record of changes made to hosted filed (e.g., FX Designer Runtime files (116), JavaFX Application Content files (118)). In one embodiment of the invention, the Content Server (104) includes the functionality to generate a JNLP file (e.g., JNLP file (114)) associated with FX Designer Runtime files (e.g., FX Designer Runtime files (116)) and content files (e.g., JavaFX Application Content files (118)). In one embodiment of the invention, the Content Server (104) automatically generates an updated JNLP file (e.g. JNLP file (114)) when FX Designer Runtime files (e.g., FX Designer Runtime files (116)) or the content files (e.g., JavaFX Application Content files (118)) are altered. In one embodiment of the invention, the Content Server (104) also includes functionality to transmit the updated JNLP file (e.g., JNLP file (114) to a webserver (e.g., Webserver (102)).

In one embodiment of the invention, the FX Designer Runtime instance (108) may receive a request to edit a JavaFX Application instance (e.g., JavaFX Application instance (110)). In one embodiment of the invention, the request is received via the instance of the application (e.g., JavaFX Application instance (110)). In one embodiment of the invention, the request is received via an FX Designer Runtime instance (e.g., FX Designer Runtime instance (108)). In one embodiment of the invention, the request may be a combination of user inputs known only to the author of the application to allow only the author to edit the application (e.g., a text password, an ordered series of mouse clicks, etc.).

In one embodiment of the invention, the Content Server (104) responds to a request to edit an application by providing FX Designer Tool files (e.g., FX Designer Tool files (120)) to the requesting FX Designer Runtime instance (e.g., FX Designer Runtime instance (108)). In one embodiment of the invention, the FX Designer Runtime instance (108) uses the FX Designer Tool files (e.g., FX Designer Tool files (120)) to create an FX Designer Tool instance (e.g., FX Designer Tool instance (112)). In one embodiment of the invention, the FX Designer Tool instance (112) includes functionality to alter the content files (e.g., JavaFX Application Content files (118)). More specifically, the FX Designer Tool instance (112) may include the functionality to alter a copy of the content files (not shown) which exist on a user's computer system (e.g., the computer system executing User Browser (100)). In one embodiment of the invention, the FX Designer Tool instance (112) includes the functionality to alter a copy of the content files (e.g., JavaFX Application Content files (118)) contemporaneously with the execution of the application instance (e.g., JavaFX Application instance (110)). In addition, changes made to the JavaFX Application Content files may be immediately incorporated into the application instance (e.g., JavaFX Application instance (110)) executing on the user's computer. Further, in one embodiment of the invention, the FX Designer Tool instance (112) includes the functionality to send the altered content files (e.g., JavaFX Application Content files (118)) to the content server (e.g., Content Server (104)). In one embodiment of the invention, the altered JavaFX Application Content files are only available on the author's computer (e.g., the computer executing the User Browser (100)) at least until the altered content files (e.g., JavaFX Application Content files (118)) are sent to the content server (e.g., Content Server (104)).

In one embodiment of the invention, more than one user may concurrently execute instances of the JavaFX Application (e.g., JavaFX Application instance (110)). Further, in one embodiment of the invention, a first user may request the content files (e.g., JavaFX Application Content files (118)) from the content server (e.g., Content Server (104)) contemporarily while a second user alters the content files (e.g., JavaFX Application Content files (118)).

Figure 2:
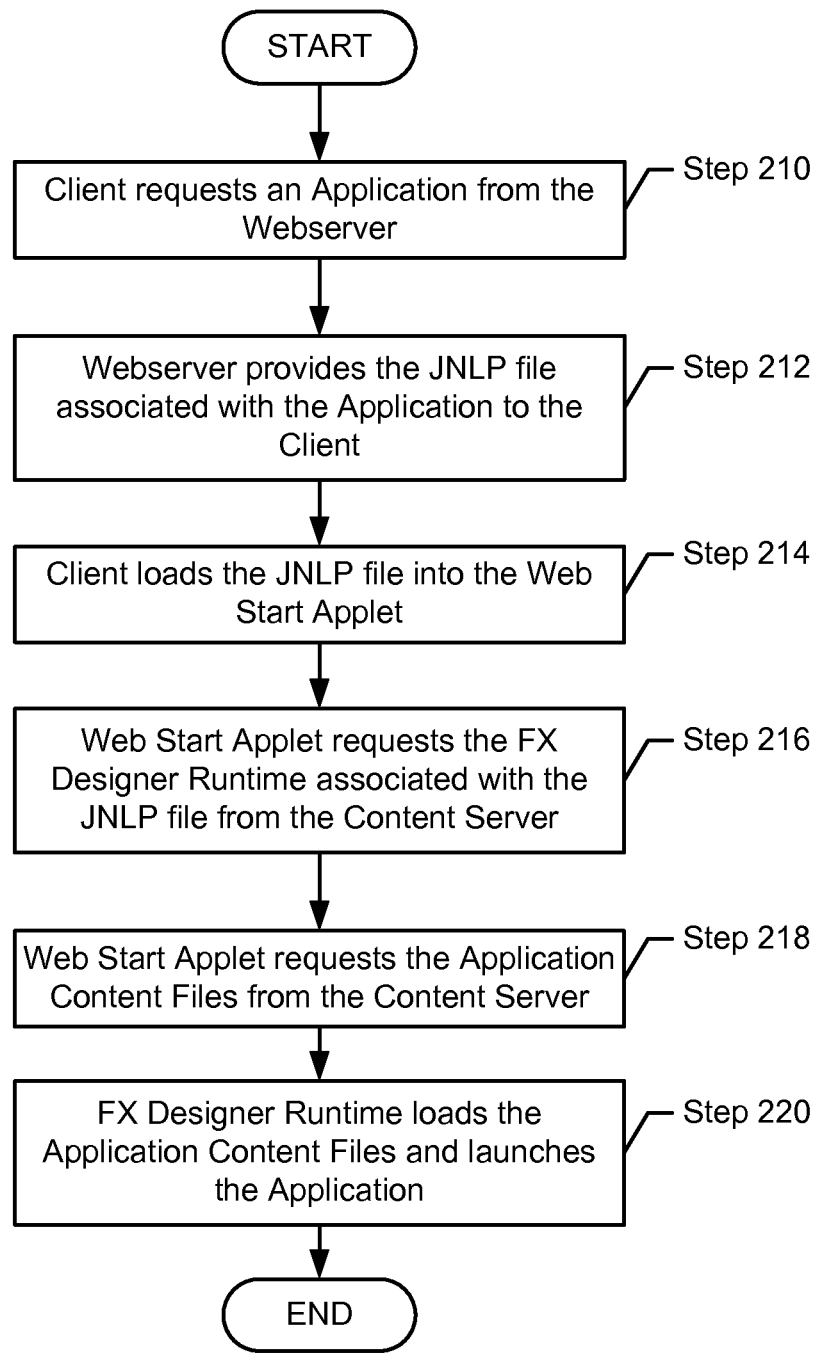
FIG. 2 shows a flowchart in accordance with one or more embodiments of the invention.

FIG. 2 shows a flow chart for launching an application in accordance with one or more embodiments of the invention. In one or more embodiments of the invention, one or more of the steps shown in FIG. 2 may be omitted, repeated, and/or performed in a different order than that shown in FIG. 2. Accordingly, the specific arrangement of steps shown in FIG. 2 should not be construed as limiting the scope of the invention.

In Step 210, the client requests an Application from the Webserver. In one embodiment of the invention, the client is a user browser under the control of a user. In one embodiment of the invention, the client sends a request to the Webserver for a JavaFX application without specifically requesting a JNLP file. In Step 212, the Webserver provides the JNLP file associated with the Application to the Client. In Step 214, the Client loads the JNLP file into the Web Start applet. In Step 216, the Web Start applet requests the FX Designer Runtime files associated with the JNLP file from the Content Server. In one embodiment of the invention, the FX Designer Runtime files are used to create a FX Designer Runtime instance. In Step 218, the Web Start applet requests the Application Content files from the Content Server. In one embodiment of the invention, the request is initiated by the FX Designer Runtime. In one embodiment of the invention, only files necessary to launch the program are requested. In one embodiment of the invention, the Application Content files include a Java Archive file. In Step 220, the FX Designer Runtime loads the Application Content files and launches the Application. In one embodiment of the invention, the Application Content files include one or more files which describe the behavior of the Application (e.g., Java classes). In one embodiment of the invention, the Application is launched using a subset of all Application Content files. In one embodiment of the invention, Application Content files are requested from the Content Server as needed by the Application instance.

Figure 3:
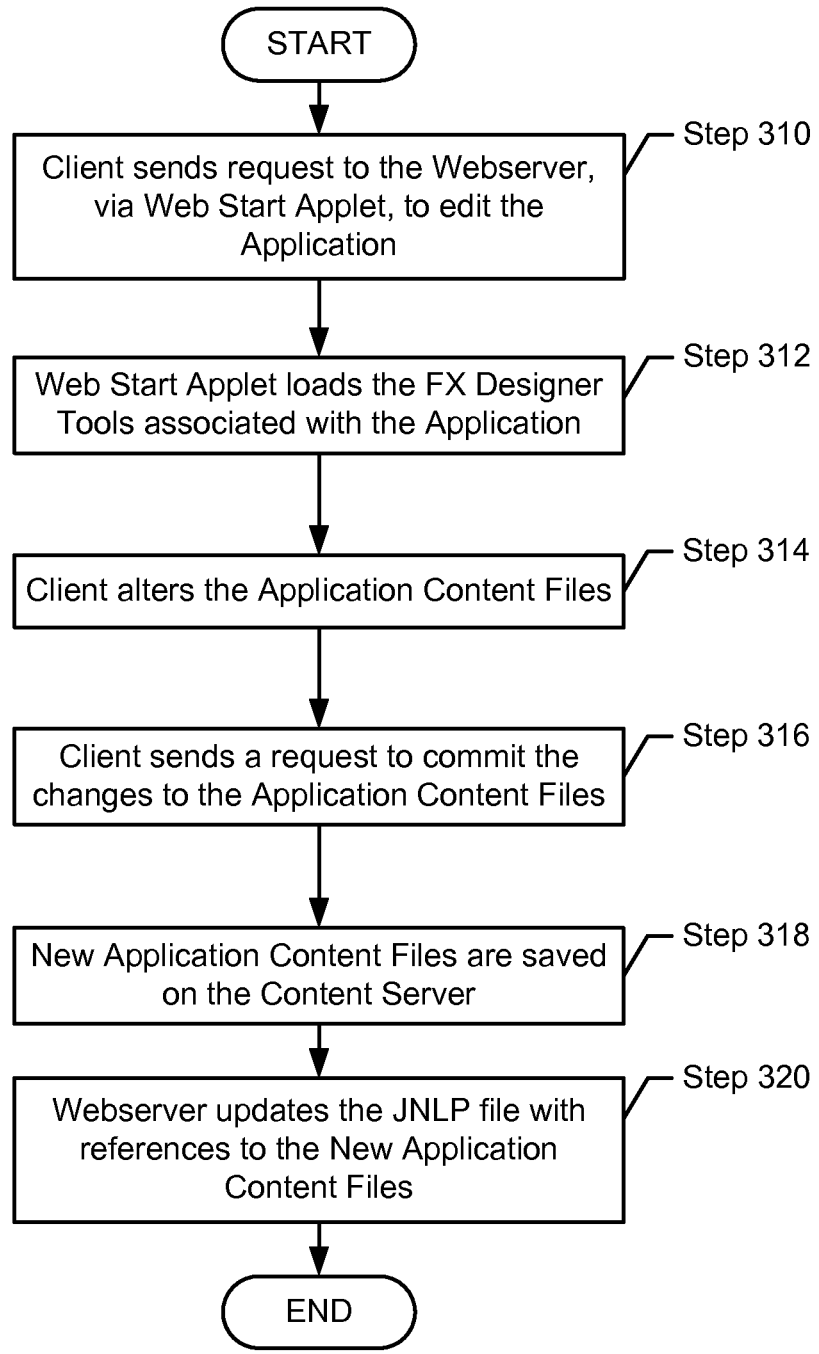
FIG. 3 shows a flowchart in accordance with one or more embodiments of the invention.

FIG. 3 shows a flow chart for launching and editing an application in accordance with one or more embodiments of the invention. In one or more embodiments of the invention, one or more of the steps shown in FIG. 3 may be omitted, repeated, and/or performed in a different order than that shown in FIG. 3. Accordingly, the specific arrangement of steps shown in FIG. 3 should not be construed as limiting the scope of the invention.

In Step 310, the Client sends a request to the Webserver, via the Web Start applet, to edit the Application. In one embodiment of the invention, Step 310 may be performed following the steps described with reference to FIG. 2. In one embodiment of the invention, the Content Server responds by sending, to the Web Start applet, the FX Designer Tool files. In Step 312, the Web Start applet loads the FX Designer Tools associated with the Application to create an FX Designer Tool instance. In Step 314, the Client alters the Application Content files using the FX Designer Tool instance. In one embodiment of the invention, altering the Application Content Files may include making changes to a graphic or audio file. In one embodiment of the invention, altering the Application Content files may include editing code, which dictates the behavior of the elements in the Application. In one embodiment of the invention, the Application Content files are edited using the FX Designer Tools. In Step 316, the Client sends a request to commit the changes to the Application Content files. In Step 318, the new Application Content files are saved on the Content Server. In Step 320, the Webserver updates the JNLP file with references to the new Application Content files. In one embodiment of the invention, a new JNLP file is generated with references to the altered Application Content files.

Figure 4:
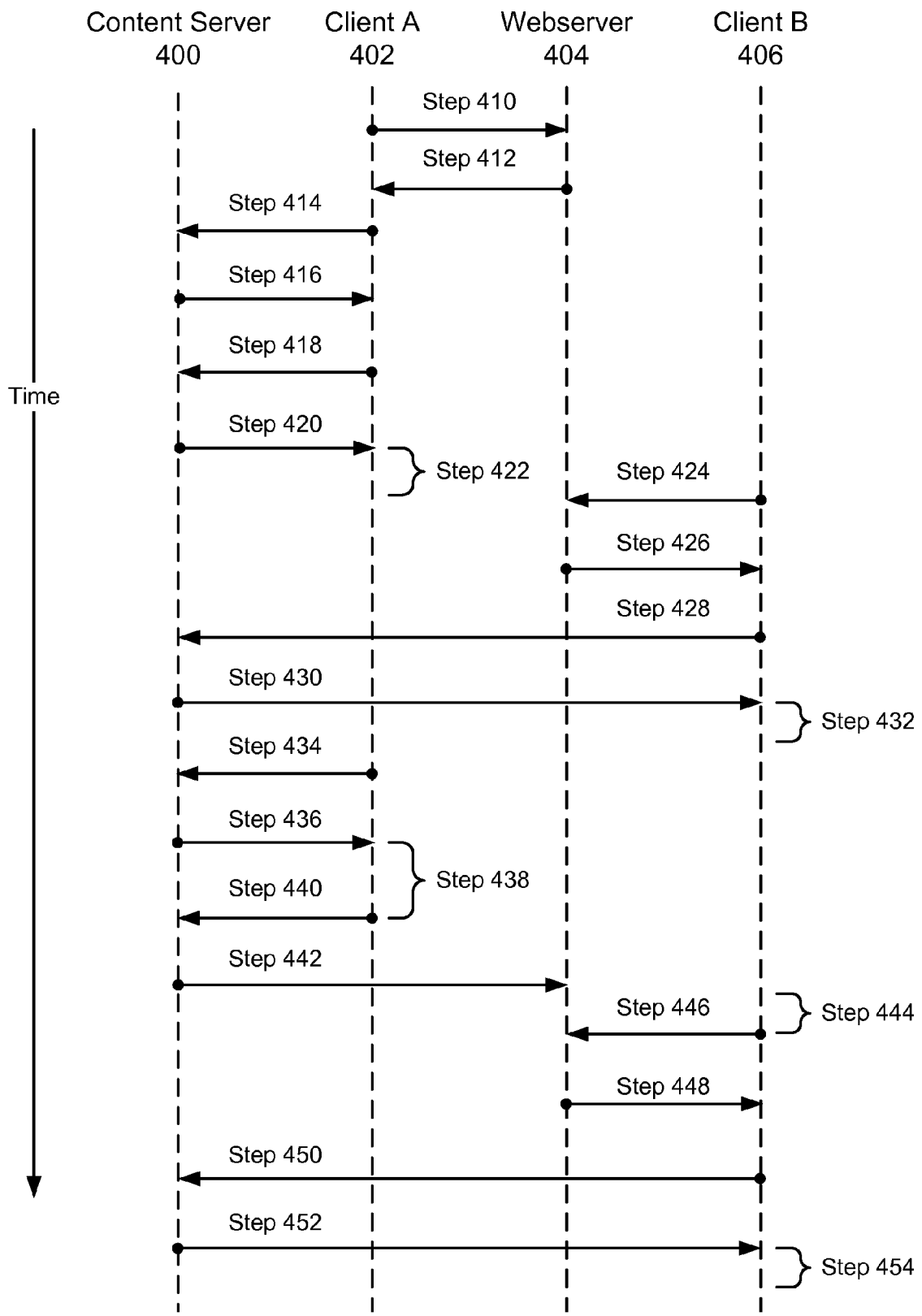
FIG. 4 shows an example in accordance with one or more embodiments of the invention.

FIG. 4 shows an exemplary communication timeline in accordance with one embodiment of the invention. The exemplary timeline is not intended to limit the scope of the invention. Further, some elements unnecessary for the purposes of the exemplary figure may have been omitted.

As depicted in FIG. 4, the exemplary communication timeline includes requests and responses over a period of time between the Content Server (400), Client A (402), the Webserver (404), and Client B.

In Step 410, Client A (402) requests the Application from the Webserver (404). In Step 412, the Webserver (404) responds to the request by providing the JNLP file associated with the Application. In Step 414, Client A (402) uses the JNLP file to locate the files necessary to execute the Application, and requests those files from the Content Server (400). In Step 416, the Content Server (400) provides the FX Designer Runtime files associated with the Application to Client A (402). In Step 418, Client A (402) requests the Application Content files associated with the Application. In Step 420, the Content Server (400) provides the Application Content files to Client A (402). In Step 422, Client A (402) executes the Application.

Continuing with the discussion of exemplary FIG. 4, in Step 424, Client B (406) requests the Application from the Webserver (404). In Step 426, the Webserver (404) responds to the request by providing the JNLP file associated with the Application to Client B (406). In Step 428, Client B (406) uses the JNLP file to locate the files necessary to execute the Application, and requests those files from the Content Server (400). In Step 430, the Content Server (400) provides the FX Designer Runtime files and the Application Content files associated with the Application to Client B (406). In Step 432, Client B (406) executes the Application. At Step 432, both Client A (402) and Client B (406) are executing the same version of the Application.

In Step 434, Client A (402) sends a request to edit the Application to the Content Server (400). In Step 436, the Content Server (400) responds by providing, to Client A (402), the FX Designer Tool files. At Step 438, Client A (402) loads the FX Designer Tool, and edits the Application Content files. At Step 440, Client A (402) indicates to the Content Server (400) that the Application Content files have been altered, and the updated Application Content files are sent to the Content Server (400). Before Step 442, Client A (402) is executing a new version of the Application. Contemporaneously, Client B (406) is executing the original Application lacking the updates sent to the Content Server in Step 440. In Step 442, the Content Server (400) notifies the Webserver (404) that the Application has been updated. In one embodiment of the invention, a new JNLP is generated by the Content Server (400) and transmitted to the Webserver (404). In one embodiment of the invention, the Webserver (404) generates the new JNLP file using information provided by the Content Server (400).

Continuing with the discussion of exemplary FIG. 4, at Step 444, Client B (406) terminates the instance of the Application instantiated in Step 432. In Step 446, Client B (406) requests the Application from the Webserver (404). In Step 448, the Webserver (404) responds to the request by providing, to Client B (406), the new JNLP file associated with the updated Application. In Step 450, Client B (406) uses the new JNLP file to locate the updated files necessary to execute the updated Application, and requests those files from the Content Server (400). In Step 452, the Content Server (400) provides the FX Designer Runtime files and the Application Content files associated with the updated Application to Client B (406). In Step 454, Client B (406) executes the updated Application. At Step 454, both Client A (402) and Client B (406) are executing the updated version of the Application.

Figure 5:
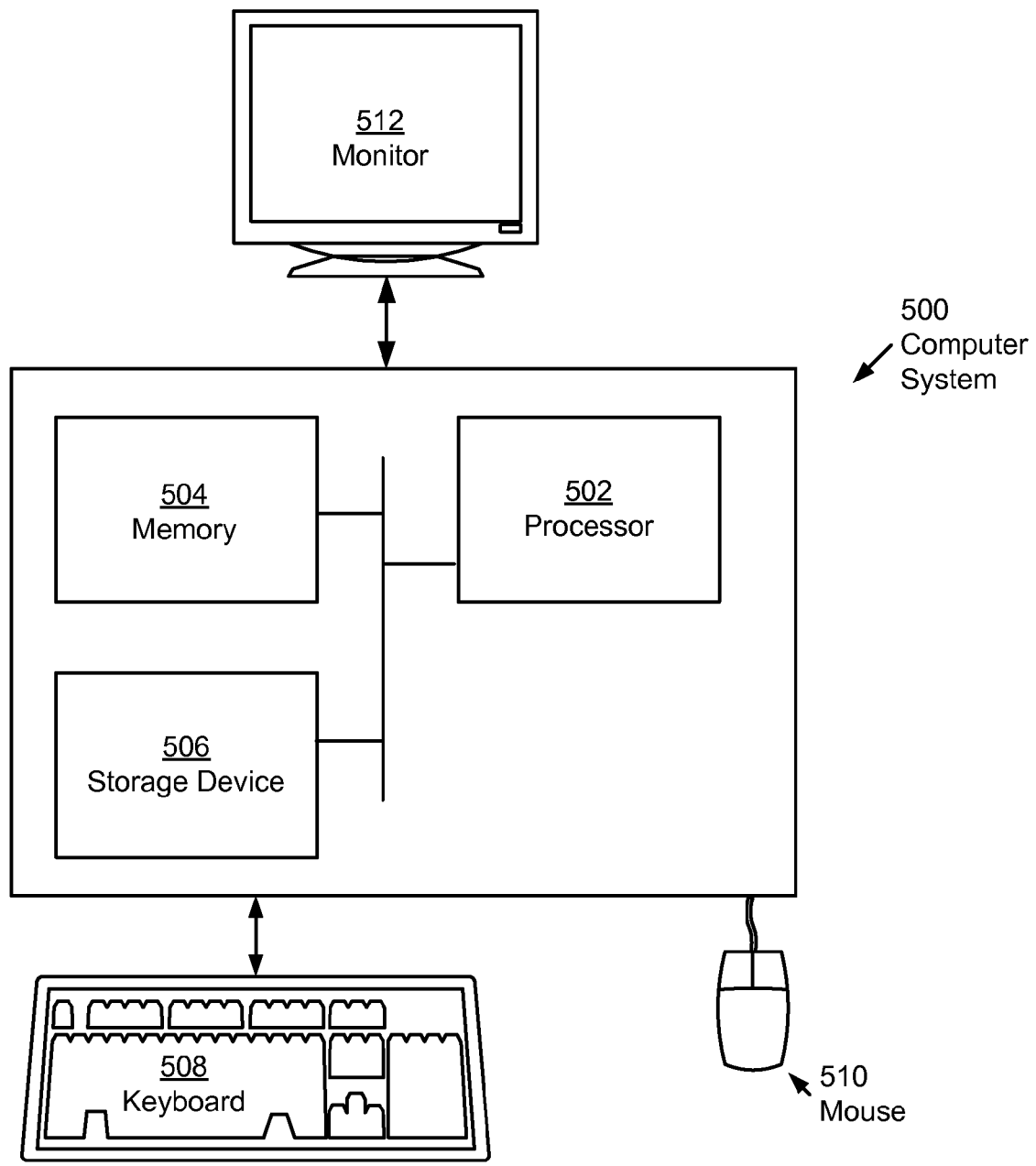
FIG. 5 shows a computer system in accordance with one or more embodiments of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer system (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be remotely located and connected to the other elements over a network. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable medium comprising software instructions for performing a method, the method comprising:
   receiving, by a content server, a first request from a client for an application content file, wherein the application content file is associated with a first Java network launch protocol (JNLP) file,
   wherein the content server is executing on a first computing system,
   wherein the client is executing on a second computing system, and
   wherein the first computing system is a separate device from the second computing system;
   providing, in response to the first request, the application content file, wherein the application content file is used to instantiate an application instance operating in a runtime environment on the client;
   receiving, from the client, via the application instance, a second request to edit the application content file;
   sending, to the client and in response to the second request, an application designer tool file,
   wherein the application designer tool file is used to edit the application content file contemporaneously with the execution of the application instance to generate an altered application content file, and
   wherein the application instance is changed within the runtime environment to incorporate alterations made in the altered application content file;
   receiving, from the client, the altered application content file generated using the application designer tool file;
   generating a second JNLP file associated with the altered application content file; and
   providing the second JNLP file.

2. The non-transitory computer readable medium of claim 1, wherein the method further comprises:
   receiving, by the content server, a third request from a subsequent client, wherein the third request comprises at least a portion of the second JNLP file; and
   providing, to the subsequent client, the altered application content file in response to the third request.

3. The non-transitory computer readable medium of claim 1, wherein the application content file is one of a plurality of application content files.

4. The non-transitory computer readable medium of claim 1, wherein the first JNLP file comprises a network location of the application content file.

5. The non-transitory computer readable medium of claim 3, wherein the client executes at least one file associated with the application content files in response to the content server providing the application content files.

6. The non-transitory computer readable medium of claim 1, wherein the application content file is a Java archive file.

7. A system comprising:
a content server located in a first computing system, the content server comprising:
a processor;
an application content file; and
a memory configured to store instructions, wherein the instructions, when executed by the processor, cause the content server to:
receive a first request from a client for the application content file, wherein the application content file is associated with a first Java network launch protocol (JNLP) file,
wherein the client is located in a second computing system, and
wherein the first computing system is a separate device from the second computing system;
provide, in response to the first request, the application content file, wherein the application content file is used to instantiate an application instance operating in a runtime environment on the client;
receive, from the client, via the application instance, a second request to edit the application content file;
send, to the client and in response to the second request, an application designer tool file,
wherein the application designer tool file is used to edit the application content file contemporaneously with the execution of the application instance to generate an altered application content file, and
wherein the application instance is changed within the runtime environment to incorporate alterations made in the altered application content file;
receive, from the client, the altered application content file generated using the application designer tool file;
generate a second JNLP file associated with the altered application content file; and
provide the second JNLP file.

8. The system of claim 7, wherein the instructions further cause the content server to:
receive a third request from a subsequent client, wherein the third request comprises at least a portion of the second JNLP file; and
provide, to the subsequent client, the altered application content file in response to the third request.

9. The system of claim 7, wherein the application content file is one of a plurality of application content files.

10. The system of claim 7, wherein the first JNLP file comprises a network location of the application content file.

11. The system of claim 9, wherein the client executes at least one file associated with the application content files in response to the content server providing the application content files.

12. The system of claim 7, wherein the application content file is a Java archive file.

13. A non-transitory computer readable medium comprising software instructions for performing a method, the method comprising:
sending, by a client, a first request for an application content file, wherein the application content file is associated with a Java network launch protocol (JNLP) file;
receiving, in response to the first request, the JNLP file;
sending a second request to a content server,
wherein the second request comprises at least a portion of the JNLP file
wherein the content server is executing on a first computing system,
wherein the client is executing on a second computing system, and
wherein the first computing system is a separate device from the second computing system;
receiving, from the content server in response to the second request, the application content file;
instantiating, within a runtime environment, an application instance using the application content file;
sending, to the content server via the application instance, a third request to edit the application content file;
receiving, from the content server in response to the third request, an application designer tool file;
editing, while the application instance is executing on the client, the application content file using the application designer tool file to generate an altered application content file,
wherein the application designer tool file is used to edit the application content file contemporaneously with the execution of the application instance;
changing, within the runtime environment, the application instance to incorporate alterations made in the altered application content file;
sending, to the content server, a fourth request comprising the altered application content file.

14. The non-transitory computer readable medium of claim 13, wherein the method further comprises:
sending, by the client, a fifth request for the application content file;
receiving, in response to the fifth request, a new JNLP file;
sending a sixth request to the content server, wherein the sixth request comprises at least a portion of the new JNLP file; and
receiving, from the content server in response to the sixth request, the altered application content file.

15. The non-transitory computer readable medium of claim 13, wherein the application content file is one of a plurality of application content files.

16. The non-transitory computer readable medium of claim 13, wherein the JNLP file comprises a network location of the application content file.

17. The non-transitory computer readable medium of claim 13, wherein the client executes the application content file in response to the content server providing the application content file.

18. The non-transitory computer readable medium of claim 13, wherein the application content file is a Java archive file.

19. A method, comprising:
receiving, by a content server, a first request from a client for an application content file, wherein the application content file is associated with a first Java network launch protocol (JNLP) file,
wherein the content server is executing on a first computing system,
wherein the client is executing on a second computing system, and
wherein the first computing system is a separate device from the second computing system;
providing, in response to the first request, the application content file, wherein the application content file is used to instantiate an application instance operating in a runtime environment on the client;

receiving, from the client, via the application instance, a second request to edit the application content file;

sending, to the client and in response to the second request, an application designer tool file,
  wherein the application designer tool file is used to edit the application content file contemporaneously with the execution of the application instance to generate an altered application content file, and
  wherein the application instance is changed within the runtime environment to incorporate alterations made in the altered application content file;

receiving, from the client, the altered application content file generated using the application designer tool file;

generating a second JNLP file associated with the altered application content file; and providing the second JNLP file.

20. The method of claim 19, further comprising:
receiving, by the content server, a third request from a subsequent client, wherein the third request comprises at least a portion of the second JNLP file; and
providing, to the subsequent client, the altered application content file in response to the third request.

21. The method of claim 19, wherein the application content file is one of a plurality of application content files.

22. The method of claim 19, wherein the first JNLP file comprises a network location of the application content file.

23. The method of claim 21, wherein the client executes at least one file associated with the application content files in response to the content server providing the application content files.

24. The method of claim 19, wherein the application content file is a Java archive file.

* * * * *